United States Patent [19]

Goto et al.

[11] Patent Number: 4,629,890
[45] Date of Patent: Dec. 16, 1986

[54] RADIATION IMAGE READ-OUT APPARATUS

[75] Inventors: Chiaki Goto; Masaru Noguchi, both of Kanagawa, Japan

[73] Assignee: Fuji Photo Film Co., Ltd., Kanagawa, Japan

[21] Appl. No.: 673,237

[22] Filed: Nov. 19, 1984

[30] Foreign Application Priority Data

Nov. 19, 1983 [JP] Japan .............................. 58-217114

[51] Int. Cl.$^4$ .............................................. G03C 5/16
[52] U.S. Cl. ................................. 250/327.2; 250/484.1
[58] Field of Search ............... 250/327.2, 484.1, 458.1, 250/461.1, 459.1, 461.2, 365, 353

[56] References Cited

U.S. PATENT DOCUMENTS

| 3,101,411 | 8/1963 | Richards | 250/461.2 |
| 4,485,302 | 11/1984 | Tanaka et al. | 250/327.2 |
| 4,564,760 | 1/1986 | Noguchi et al. | 250/484.1 |
| 4,568,984 | 2/1986 | Juergensen et al. | 250/574 |
| 4,578,581 | 3/1986 | Tanaka et al. | 250/327.2 |

*Primary Examiner*—Carolyn E. Fields
*Attorney, Agent, or Firm*—Sughrue, Mion, Zinn, Macpeak, and Seas

[57] ABSTRACT

In a radiation image read-out apparatus for scanning a stimulable phosphor carrying a radiation image stored therein by stimulating rays, and photoelectrically detecting light emitted by the stimulable phosphor by use of a photodetector via a light guide member, the light guide member is fabricated into a hollow tubular shape. The light guide member is positioned in face-to-face relation to the stimulable phosphor so that the longitudinal direction of the light guide member coincides with the scanning direction of the stimulating rays. The photodetector is secured to at least one end face of the light guide member. The light guide member is provided with a slit extending longitudinally for passing the stimulating rays therethrough and introducing the light emitted by the stimulable phosphor into the light guide member.

8 Claims, 8 Drawing Figures

RADIATION IMAGE READ-OUT APPARATUS

BACKGROUND OF THE INVENTION

1. Field of the Invention

This invention relates to a radiation image read-out apparatus for exposing a stimulable phosphor carrying a radiation image stored therein to stimulating rays which cause the stimulable phosphor to emit light in proportion to the radiation energy stored, guiding the emitted light to a photodetector via a light guide member, and photoelectrically detecting the radiation image.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to stimulating rays such as visible light, light is emitted by th phosphor in proportion to the stored energy of the radiation. A phosphor exhibiting such properties is referred to as a stimulable phosphor.

As disclosed, for example, in U.S. Pat. No. 4,239,968, it has been proposed to use a stimulable phosphor in a radiation image recording and reproducing system. In the radiation image recording and reproducing system, the energy of the light emitted by the stimulable phosphor when it is exposed to stimulating rays is much smaller than the energy of stimulating rays (approximately $10^{-5}$ times the energy of stimulating rays), and the emitted light is non-directional. Therefore, when the read-out apparatus is fabricated, the light receiving solid angle of the light guide member should be made as large as possible to guide as much emitted light as possible and improve the S/N ratio.

Accordingly, the Applicant proposed in U.S. Pat. No. 4,302,671 to provide the light receiving face of the photodetector, which is positioned close to a stimulable phosphor sheet in face-to-face relation, with a reflecting mirror or a triangular prism sufficiently smaller than the area of the light receiving face of the photodetector so that the reflecting mirror or the triangular prism protrudes from the light receiving face. In this technique, stimulating rays such as a laser beam incident laterally and exhibiting high directivity are reflected by the reflecting mirror or the triangular prism onto the stimulable phosphor sheet. However, in this case, a space at least equal to the amount of protrusion of the reflecting mirror or the triangular prism must be left between the light receiving face and the stimulable phosphor sheet. Therefore, the light receiving solid angle of the light guide member becomes small.

The Applicant also proposed in U.S. Pat. No. 4,346,295 to position a light guide member having a special shape so that one end face (light input face) is close to a stimulable phosphor sheet in face-to-face relation thereto along a scanning line of stimulating rays, and to guide light emitted by the stimulable phosphor sheet upon stimulation thereof to a photodetector by use of the light guide member. In order to efficiently guide light emitted by the stimulable phosphor sheet upon stimulation thereof and entering from the light input face by total reflection inside of the light guide member up to a light output face, the light guide member is fabricated so that the light input face is shaped in a linear form and the light output face is formed in a ring shape by gradually bending the light guide member from the light input face to the light output face. Since the light guide member is fabricated in such a shape, the size thereof inevitably becomes large, and is an obstacle to reduction of the size of the overall radiation image read-out apparatus.

SUMMARY OF THE INVENTION

The primary object of the present invention is to provide a radiation image read-out apparatus using a small light guide member which can be positioned very close to a stimulable phosphor sheet.

Another object of the present invention is to provide a radiation image read-out apparatus which is small in size and which efficiently detects light emitted by a stimulable phosphor sheet upon stimulation thereof.

The present invention provides a radiation image read-out apparatus for scanning a stimulable phosphor carrying a radiation image stored therein by stimulating rays which cause the stimulable phosphor to emit light in proportion to the radiation energy stored, and photoelectrically detecting the emitted light by a photodetector via a light guide member, wherein the improvement comprises fabricating said light guide member into a hollow tubular shape, positioning said light guide member in face-to-face relation to said stimulable phosphor so that the longitudinal direction of said light guide member coincides with the scanning direction of said stimulating rays, securing said photodetector to at least one end face of said light guide member, and providing said light guide member with a slit extending in said longitudinal direction for passing said stimulating rays therethrough and for introducing the light, which is emitted by said stimulable phosphor when said stimulable phosphor is scanned by said stimulating rays, into said light guide member.

In the present invention, the light guide member is fabricated into a hollow tubular shape and is provided with a slit standing face to face with a stimulable phosphor. Stimulating rays are passed through the slit and are made to impinge upon the stimulable phosphor carrying a radiation image stored therein, and light emitted by the stimulable phosphor in proportion to the stored radiation energy when it is exposed to the stimulating rays is introduced into the light guide member via the slit. The light thus introduced is reflected inside of the hollow portion of the light guide member and is guided to the photodetector secured to at least one end face of the light guide member. Therefore, it is possible to make the light guide member small and to position the light guide member very close to the stimulable phosphor. Accordingly, it becomes possible to reduce the overall size of the radiation image read-out apparatus.

DESCRIPTION OF THE PREFERRED EMBODIMENTS

The present invention will hereinbelow be described in further detail with reference to the accompanying drawings.

Figure 1:
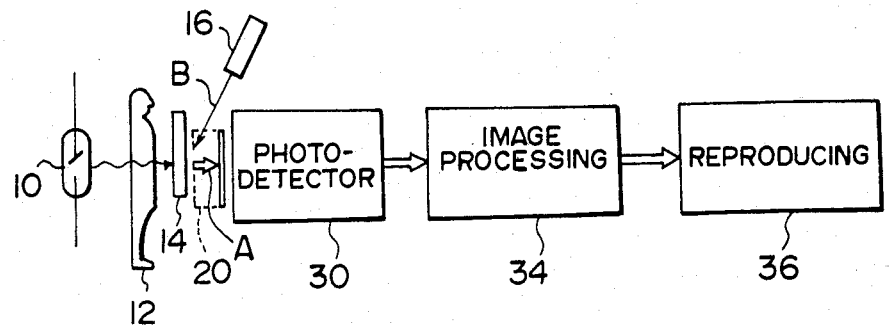
FIG. 1 is a schematic view showing the basic configuration of an X-ray image recording and reproducing system in which the radiation image read-out apparatus in accordance with the present invention is employed.

FIG. 1 shows the basic configuration of an X-ray image recording and reproducing system in which the radiation image read-out apparatus in accordance with the present invention is employed. X-rays emitted by an X-ray tube 10 pass through an object 12 such as a patient to an extent depending on the differences in the X-ray transmittance between portions of the object 12. The X-rays impinge upon a stimulable phosphor sheet 14, and X-ray energy is stored therein in accordance with the amount of X-rays impinging thereupon. That is, a latent X-ray image is stored in the stimulable phosphor sheet 14. The stimulable phosphor costituting the stimulable phosphor sheet 14 may, for example, be a rare earth element activated alkaline earth metal fluorohalide phosphor as disclosed in Japanese Unexamined Patent Publication No. 56(1981)-11348. When this phosphor is exposed to stimulating rays, it emits light A having a wavelength within the range of 300 nm to 500 nm.

The stimulable phosphor sheet 14 carrying the latent X-ray image stored therein is then exposed to stimulating rays B emitted by a stimulating ray source 16. In order to facilitate separation from the light B of the light A emitted by the stimulable phosphor sheet 14 upon stimulation thereof, the wavelength distribution of the stimulating ray B should be different from and far apart from the wavelength distribution of the light A emitted by the stimulable phosphor sheet 14. Namely, the spectrum of the stimulating rays B should not overlap the spectrum of the light A emitted by the stimulable phosphor sheet 14. Accordingly, the stimulating rays B should preferably be a He-Ne laser beam (633 nm), a YAG laser beam (1064 nm), a ruby laser beam (694 nm), or the like, which has a wavelength longer than that of the light A emitted by the stimulable phosphor sheet 14.

Figure 2:
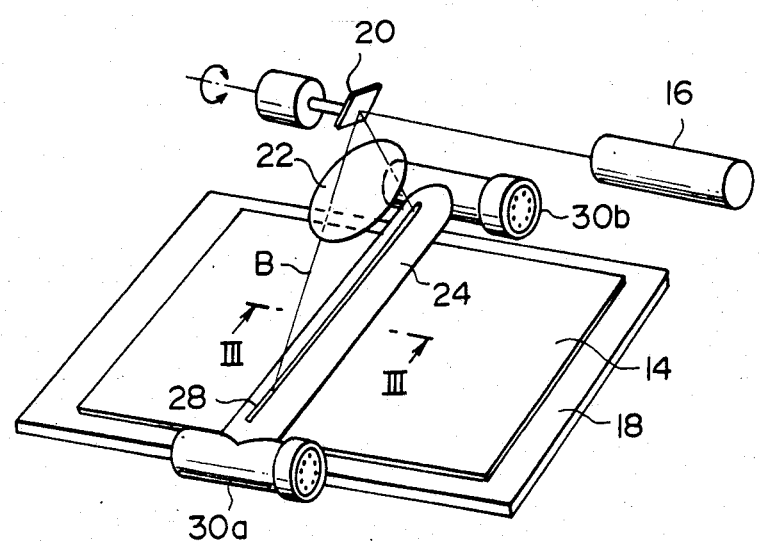
FIG. 2 is a perspective view showing an embodiment of the radiation image read-out apparatus in accordance with the present invention.
Figure 3:
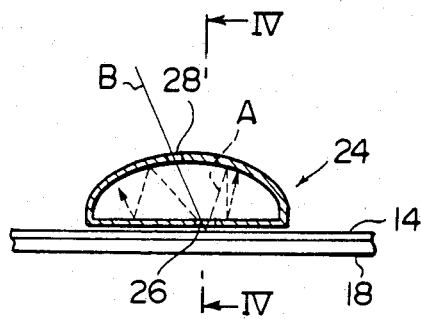
FIG. 3 is a sectional view taken along line III—III of FIG. 2.
Figure 4:
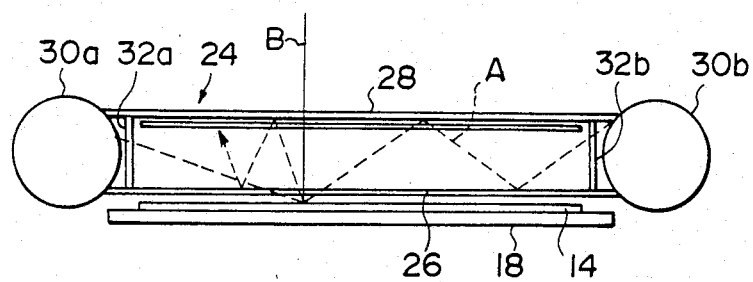
FIG. 4 is a sectional view taken along line IV—IV of FIG. 3.

FIG. 2 is a perspective view showing an embodiment of the radiation image read-out apparatus in accordance with the present invention, FIG. 3 is a sectional view taken along line III—III of FIG. 2, and FIG. 4 is a sectional view taken along line IV—IV of FIG. 3. In this embodiment, a stimulable phosphor sheet 14 is supported on a flat plate-like feed base 18. Stimulating rays B emitted by the light source 16 are reflected by a light deflector 20 and are made to impinge upon the stimulable phosphor sheet 14 so as to scan it. The scanning direction (i.e. main scanning direction) of the stimulating rays B is approximately normal to the feed direction (i.e. sub-scanning direction) of the feed base 18. Movement of the feed base 18 is synchronized so that it is moved by a distance equal to the scanning line spacing while scanning by the stimulating rays B is conducted along one scanning line. Between the light deflector 20 and the stimulable phosphor sheet 14 is positioned a lens 22 for making the stimulating rays B impinge upon the stimulable phosphor sheet 14 approximately at a predetermined angle and for making the scanning speed on the stimulable phosphor sheet 14 nearly constant.

A light guide member 24 is fabricated of glass, an acrylic material, or the like into a hollow tubular shape, and the cross-section thereof normal to the longitudinal direction is in the shape of a laterally elongated circle with the lower half cut off. The inner surface of the light guide member 24 is processed into a mirror-like surface or, when the light guide member 24 is made of a transparent material, the inner surface or the outer surface is processed into a mirror-like surface so that light entering the hollow portion is reflected inside of the hollow portion by the inner surface or the outer surface. The lower face of the light guide member 24, i.e. the face standing face to face with the stimulable phosphor sheet 14 is provided with a slit 26 extending in the longitudinal direction of the light guide member 24. Also, the upper face of the light guide member 24 is provided with a light input window 28 enlongated in parallel with the slit 26. The light input window 28 is provided with a slit-like aperture. Instead of forming the aperture, the light input window 28 may also be formed by eliminating the processing of the light guide member 24 into a mirror-like surface at the portion corresponding to the light input window 28 so that the stimulating rays B are transmitted through this portion to the slit 26. In this case, the light input window 28 should preferably be formed as a dichroic optical plane so that the light A emitted by the stimulable phosphor sheet 14 is prevented from leaking out of the light input window 28.

Photodetectors 30a and 30b, which are, for example, photomultipliers, are secured to the end faces of the light guide member 24, and the light guide member 24 is supported above the stimulable phosphor sheet 14 so that the light input window 28 and the slit 26 are parallel with the scanning direction of the stimulating rays B. When photomultipliers are used as the photodetectors 30a and 30b, they should preferably be of the side-on type in which light is incident laterally, and should be positioned in parallel with the stimulable phosphor sheet 14. This configuration is further adapted for reducing the apparatus size. As shown in FIG. 4, optical filters 32a and 32b should preferably be positioned adjacent the light receiving faces of the photodetectors 30a and 30b so that the stimulating rays B are cut off and only the light A emitted by the stimulable phosphor sheet 14 is passed.

In the embodiment of FIG. 2, the stimulating rays B emitted by the light source 16 are deflected by the light deflector 20 and are made to impinge upon the stimulable phosphor sheet 14 via the lens 22, the light input window 28 and the slit 26. When exposed to the stimulating rays B, the stimulable phosphor sheet 14 emits light A having an intensity proportional to the X-ray energy stored. The light A emitted by the stimulable phosphor sheet 14 enters the light guide member 24 from the slit 26, and is reflected inside of the hollow portion of the light guide member 24 up to the photodetectors 30a and 30b which detect the amount of the light A. As the stimulable phosphor sheet 14 is moved by the feed base 18 and scanned by the stimulating rays B, the X-ray image stored in the stimulable phosphor sheet 14 is sequentially read out by the photodetectors 30a and 30b.

The light A detected by the photodetectors 30a and 30b is converted thereby into an electric signal, which is electrically processed by an image processing apparatus 34 as shown in FIG. 1 and is used to reproduce a visible image on a recording material such as a photographic film or a display device such as a cathode ray tube by use of an image reproducing apparatus 36.

Since the light guide member 24 is formed in the hollow tubular shape, it is not necessary to form a linear light input face and a ring-shaped light output face by gradually bending the member from the light input face to the light output face as in the conventional apparauts. Therefore, the light guide member 24 can be positioned very close to the stimulable phosphor sheet 14, it is possible to make the radiation image read-out apparatus very small.

In the aforesaid embodiment, as shown in FIG. 3, the slit 26 is positioned so that the stimulating rays B impinge upon the stimulable phosphor sheet 14 at an oblique angle with respect to a line normal to the stimulable phosphor sheet 14. Further, the slit 26 is deviated from the center of the light guide member 24. That is, the light guide member 24 is fabricated such that, on a cross-sectional plane normal to the scanning direction of the stimulating rays B, the light guide member 24 is asymmetric with respect to a line which is normal to the stimulable phosphor sheet 14 and which passes through the slit 26. In general, the light A is emitted by the stimulable phosphor sheet 14 in such an intensity distribution that the intensity is the largest in the direction normal to the stimulable phosphor sheet 14. Therefore, by constructing the light guide member 24 as described above, it becomes possible to reduce the amount of the light A leaking out of the light input window 28 and to reduce the amount of the light A leaking out of the slit 26 by being reflected by the hollow portion of the light guide member 24. Accordingly, it is possible to improve the efficiency of receiving the light A.

Of course, the cross-sectional shape of the light guide member in the radiation image read-out apparatus of the present invention is not limited to that shown in FIG. 3 but may be changed in various manners.

Figure 5:
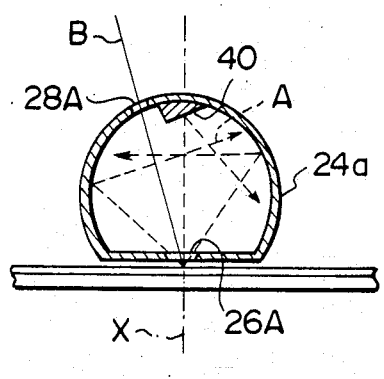
FIG. 5 is a sectional view showing another embodiment of the light guide member of the radiation image read-out apparatus in accordance with the present invention, and taken at a position corresponding to FIG. 3.

FIG. 5 is a sectional view showing another embodiment of the light guide member of the radiation image read-out apparatus of the present invention, and taken at a position corresponding to FIG. 3. In this embodiment, a slit 26A of a light guide member 24A is positioned on the axis X of symmetry normal to the stimulable phosphor sheet 14. On the upper inner surface of the light guide member 24A, a reflecting mirror 40 is positioned in the longitudinal direction of the light guide member 24A so that the light A emitted by the stimulable phosphor sheet 14 is reflected thereby in directions other than the slit 26A. Therefore, when the stimulable phosphor sheet 14 is exposed to the stimulating rays B passing through a light input window 28A and the slit 26A, the most intense component of the emitted light A along the axis X of symmetry is efficiently guided to the photodetectors 30a and 30b.

Figure 6:
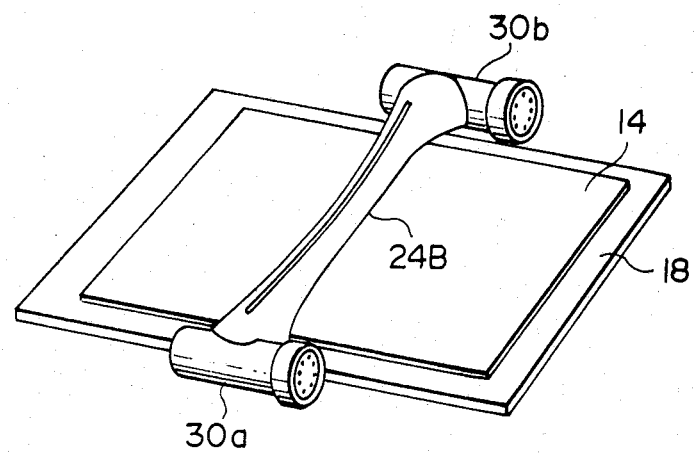
FIG. 6 is a perspective view showing a further embodiment of the light guide member of the radiation image read-out apparatus in accordance with the present invention.
Figure 7:
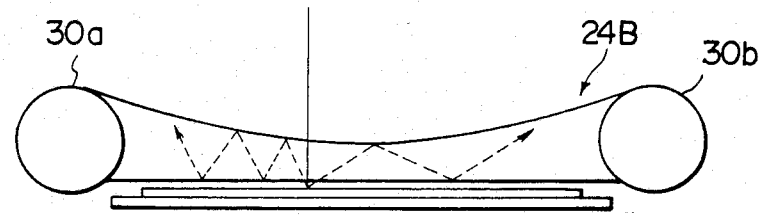
FIG. 7 is a sectional view showing the light guide member of FIG. 6 and taken at a position corresponding to FIG. 4.
Figure 8:
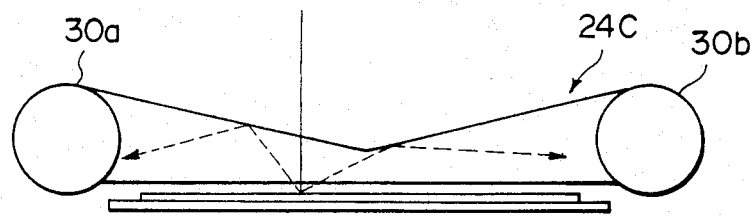
FIG. 8 is a sectional view showing a still further embodiment of the light guide member of the radiation image read-out apparatus in accordance with the present invention, and taken at a position corresponding to FIG. 4.

FIG. 6 is a perspective view showing a further embodiment of the light guide member of the radiation image read-out apparatus of the present invention, and FIG. 7 is a sectional view of FIG. 6 taken in the main scanning direction. In this embodiment, a light guide member 24B is formed approximately in a saddle shape. FIG. 8 is a sectional view showing a still further embodiment of the light guide member of the radiation image read-out apparatus of the present invention, and taken in the main scanning direction. In FIG. 8, a light guide member 24C is fabricated by joining two truncated cones so that the diameter at the center is smaller and those at end portions are larger. In the embodiments of FIGS. 7 and 8, it is possible to decrease the number of reflections inside of the light guide member and to reduce attenuation of the light A emitted by the stimulable phosphor sheet 14 as compared with the embodiment of FIG. 4. Also, in the embodiments of FIGS. 7 and 8, it is possible to guide nearly completely the light A emitted normal to the stimulable phosphor sheet 14 and to further improve the light receiving efficiency by forming the slit 26 at an asymmetric position in the light guide member as shown in FIG. 3 or by positioning the reflecting mirror 40 as shown in FIG. 5.

In the aforesaid embodiments, the photodetectors 30a and 30b are secured to the end faces of the light guide members 24, 24A, 24B, and 24C. However, it is also possible to secure a single photodetector to one end face of each light guide member. In this case, in the embodiment of FIG. 2, a reflecting mirror should preferably be positioned at the other end face of the light guide member. It is also possible to fabricate the light guide member in a conical shape so that the diameter of the light guide member increases only toward one end face.

When scanning is conducted, since the distance from the point of the stimulable phosphor sheet 14 emitting the light A to the photodetectors 30a and 30b changes, the number of reflections and the light guiding conditions change, and shading arises. However, the effect of shading can be eliminated electrically by experimentally measuring the light receiving sensitivity corresponding each light emitting position and correcting the electric image signals at the step of calculation processing.

We claim:

1. A radiation image read-out apparatus for scanning a stimulable phosphor carrying a radiation image stored therein by stimulating rays which cause the stimulable phosphor to emit light in proportion to the radiation energy stored, and photoelectrically detecting the emitted light by a photodetector via a light guide member, wherein the improvement comprises a hollow tubular-shaped light guide member positioned in face-to-face relation to said stimulable phosphor so that the longitudinal direction of said light guide member coincides with the scanning direction of said stimulating rays, said photodetector secured to at least one end face of said light guide member, said light guide member provided with a slit extending in said longitudinal direction, said slit positioned for passing said stimulating rays therethrough and for introducing the light, which is emitted by said stimulable phosphor when said stimulable phosphor is scanned by said stimulating rays, into said light guide member.

2. An apparatus as defined in claim 1 wherein said slit is positioned so that said stimulating rays impinge upon said stimulable phosphor at an angle with respect to a line normal to said stimulable phosphor.

3. An apparatus as defined in claim 2 wherein said light guide member is asymmetric with respect to a line which is normal to said stimulable phosphor and which passes through said slit, on a cross-section normal to the scanning direction of said stimulating rays.

4. An apparatus as defined in claim 1 wherein said light guide member is asymmetric with respect to a line which is normal to said stimulable phosphor and which passes through said slit, on a cross-section normal to the scanning direction of said stimulating rays.

5. An apparatus as defined in claim 1 wherein said light guide member is shaped so that the cross-section normal to the scanning direction of said stimulating rays is of the shape of a laterally elongated circle with the lower half cut off.

6. An apparatus as defined in claim 1 wherein said light guide member is provided with a reflecting mirror secured to the upper inner surface in the longitudinal direction of said light guide member so that the light emitted by said stimulable phosphor is reflected in directions other than said slit.

7. An apparatus as defined in claim 1 wherein said light guide member is shaped so that the hollow portion is widened from the center to the end faces in the longitudinal direction of said light guide member.

8. An apparatus as defined in claim 1 wherein said light guide member comprises two truncated cones joined so that the diameter at the center is smaller and those at end portions are larger.

* * * * *